United States Patent
Chang et al.

(10) Patent No.: US 8,743,796 B2
(45) Date of Patent: *Jun. 3, 2014

(54) METHOD AND APPARATUS FOR ALLOCATING SEQUENCE TO SYNCHRONIZATION CHANNEL FOR NODE IDENTIFICATION IN WIRELESS COMMUNICATION SYSTEM

(75) Inventors: Kapseok Chang, Daejeon (KR); Young-Hoon Kim, Daejeon (KR); Woo Yong Lee, Daejeon (KR); Hyun Kyu Chung, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 526 days.

This patent is subject to a terminal disclaimer.

(21) Appl. No.: 12/641,679

(22) Filed: Dec. 18, 2009

(65) Prior Publication Data
US 2010/0157877 A1  Jun. 24, 2010

(30) Foreign Application Priority Data
Dec. 19, 2008  (KR) .................. 10-2008-0130414

(51) Int. Cl.
*H04W 4/00* (2009.01)
(52) U.S. Cl.
USPC ........................ 370/329; 370/335; 455/502

(58) Field of Classification Search
USPC .......... 370/310, 315–327, 329–338; 375/260, 375/343
See application file for complete search history.

(56) References Cited

U.S. PATENT DOCUMENTS

| 2007/0254685 A1 | 11/2007 | Oketani et al. | |
| 2007/0258530 A1 * | 11/2007 | Kim et al. | 375/260 |
| 2010/0142433 A1 * | 6/2010 | Womack et al. | 370/315 |
| 2011/0176502 A1 * | 7/2011 | Chung et al. | 370/329 |

FOREIGN PATENT DOCUMENTS

KR  1020080059002 A  6/2008

* cited by examiner

*Primary Examiner* — Ricky Ngo
*Assistant Examiner* — Iqbal Zaidi
(74) *Attorney, Agent, or Firm* — Ladas & Parry LLP

(57) ABSTRACT

Provided is an apparatus for allocating a sequence to a synchronization channel for a node identification (ID), the apparatus including: a base node sequence generator to generate a base sequence that is a sequence for a node ID of a base node; a relay node sequence generator to generate a relay sequence that is a sequence for a node ID of a relay node by transforming the base sequence; a baseband signal generator to generate a baseband signal by mapping the base sequence or the relay sequence to a frequency domain and a time domain; and a transmitter to transmit the baseband signal.

10 Claims, 9 Drawing Sheets

METHOD AND APPARATUS FOR ALLOCATING SEQUENCE TO SYNCHRONIZATION CHANNEL FOR NODE IDENTIFICATION IN WIRELESS COMMUNICATION SYSTEM

CROSS-REFERENCE TO RELATED APPLICATION

This application claims the benefit of Korean Patent Application No. 10-2008-0130414, filed on Dec. 19, 2008, in the Korean Intellectual Property Office, the disclosure of which is incorporated herein by reference.

BACKGROUND

1. Field of the Invention

Embodiments of the present invention relate to a method of allocating a node identification (ID) in a wireless communication system, and more particularly, to a method and apparatus for allocating a node sequence to a frequency domain of a synchronization channel of a transmission end in order to distinguish a base node from a relay node, when the relay node or a small base node having a portion of or all of base node functions exists within the base node.

2. Description of the Related Art

Among various types of wireless communication systems, a wireless communication system that may obtain a mutual cooperation by connecting a plurality of relay nodes or small base nodes to a single base node may exist.

The above wireless communication may support many users using a relatively small amount of resources. However, depending upon circumstances, a relay node may be additionally identified within a particular base node. Therefore, a much larger number of nodes than a number of nodes being currently used may be secured for the above identification.

Accordingly, there is a desire for a node ID allocation method and apparatus that may generate a number of nodes needed using a limited amount of frequency resources and time resources.

SUMMARY

An aspect of the present invention provides a method and apparatus for allocating a sequence to a synchronization channel for a node identification (ID) that may generate a sequence for a node ID of a relay node based on a sequence of a node ID allocated to a base node, and thereby may maximize an increase in a number of nodes.

Another aspect of the present invention also provides a method and apparatus for allocating a sequence to a synchronization channel for a node ID that may generate a sequence of a node ID of a relay node based on a sequence of a node ID allocated to a base node, and thereby may minimize an effect against a system when variably increasing or decreasing a number of relay nodes for each base node.

According to an aspect of the present invention, there is provided a transmission apparatus for allocating a sequence to a synchronization channel for a node ID, the transmission apparatus including: a base node sequence generator to generate a base sequence that is a sequence for a node ID of a base node; a relay node sequence generator to generate a relay sequence that is a sequence for a node ID of a relay node by transforming the base sequence; a baseband signal generator to generate a baseband signal by mapping the base sequence or the relay sequence to a frequency domain and a time domain; and a transmitter to transmit the baseband signal.

The relay node sequence generator may define a binary codeword, and may generate the relay sequence by transforming the base sequence according to a sign of the binary codeword.

The relay node sequence generator may generate the relay sequence by combining a cyclic sequence of the base sequence with a scramble sequence mapped to a sequence index for a primary synchronization channel.

The relay node sequence generator may define a binary codeword, transform the base sequence according to a sign of the binary codeword, and generate the relay sequence by combining the transformed base sequence with a cyclic sequence of the base sequence or a scramble sequence mapped to a sequence index for a primary synchronization channel.

According to another aspect of the present invention, there is provided a reception apparatus for allocating a sequence to a synchronization channel for a node ID, the reception apparatus including: a receiver to receive a baseband signal; a filtering unit to filter the baseband signal based on a bandwidth allocated to the synchronization channel; a time domain correlation unit to calculate a correlation value for the baseband signal and a time domain signal stored in advance in a synchronization channel symbol interval, and to extract a sample time having a greatest correlation value for each primary synchronization channel sequence index; a frequency domain correlation unit to calculate a correlation value for the baseband signal and a frequency signal for a node ID obtainment in the sample time, and to verify the greatest correlation value; and a node ID index selector to generate a combined correlation value by combining a correlation value of the sample time extracted in the time domain correlation unit and the correlation value verified in the frequency domain correlation unit, and to select a node ID index and a time synchronization point at a point in time when the combined correlation value is maximized, as a node ID index and a time synchronization point recognized by the receiver.

According to still another aspect of the present invention, there is provided a transmission method of allocating a sequence to a synchronization channel for a node ID, the transmission method including: generating a base sequence that is a sequence for a node ID of a base node; verifying whether an entity transmitting a baseband signal is the base node; generating a relay sequence that is a sequence for a node ID of a relay node by transforming the base sequence when the entity transmitting the baseband signal is not the base node; generating the baseband signal by mapping the base sequence to a frequency domain and a time domain when the entity transmitting the baseband signal is the base node, and generating the baseband signal by mapping the relay sequence to the frequency domain and the time domain when the entity transmitting the baseband signal is not the base node; and transmitting the baseband signal.

EFFECT

According to embodiments of the present invention, it is possible to maximize an increase in a number of nodes by generating a sequence for a node identification (ID) of a relay node based on a sequence for a node ID allocated to a base node.

Also, according to embodiments of the present invention, it is possible to generate a sequence for a node ID of a relay node based on a sequence for a node ID allocated to a base node. Through this, when variably increasing or decreasing a number of relay nodes for each base node, it is possible to minimize an effect against a system.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Figure 1:
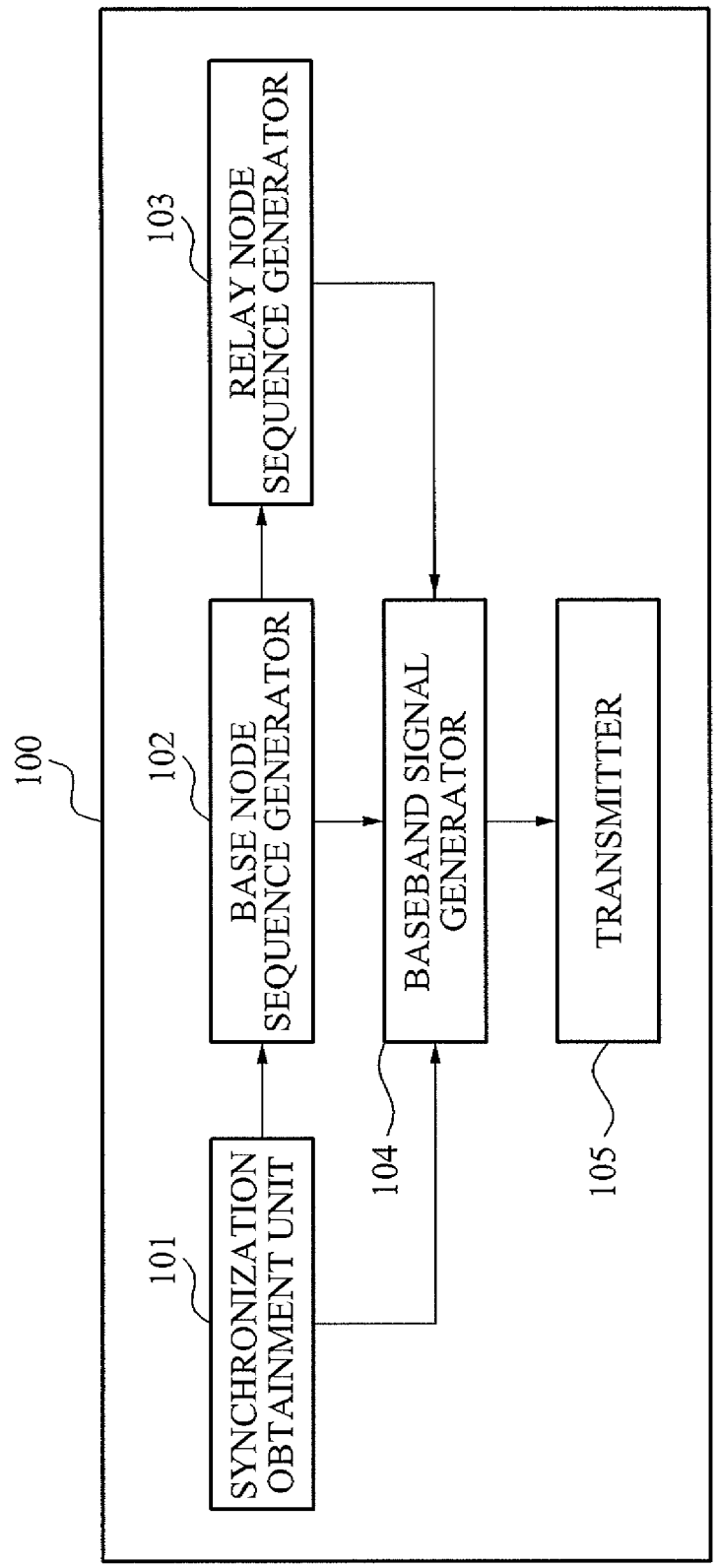
FIG. 1 is a block diagram illustrating a transmission apparatus for allocating a sequence to a synchronization channel for a node identification (ID) according to an embodiment of the present invention.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

FIG. 1 is a block diagram illustrating a transmission apparatus 100 for allocating a sequence to a synchronization channel for a node identification (ID) according to an embodiment of the present invention.

Referring to FIG. 1, in the transmission apparatus 100, when a synchronization obtainment unit 101 obtains a symbol and a frequency synchronization, a base node sequence generator 102 may generate a base sequence that is a sequence for a node ID of a base node. A relay node sequence generator 103 may generate a relay sequence that is a sequence for a node ID of a relay node by transforming the base sequence. A baseband signal generator 104 may generate a baseband signal by mapping the base sequence or the relay sequence to a frequency domain and a time domain. A transmitter 105 may transmit the baseband signal.

The synchronization obtainment unit 101 may be executed prior to the base node sequence generator 102 according to a hierarchical procedure to thereby obtain the symbol and the frequency synchronization. Alternately, the synchronization obtainment unit 101 may be simultaneously executed together with the baseband node sequence generator 102 to thereby provide the frequency synchronization to the baseband signal generator 104 according to a non-hierarchical procedure.

Figure 2:
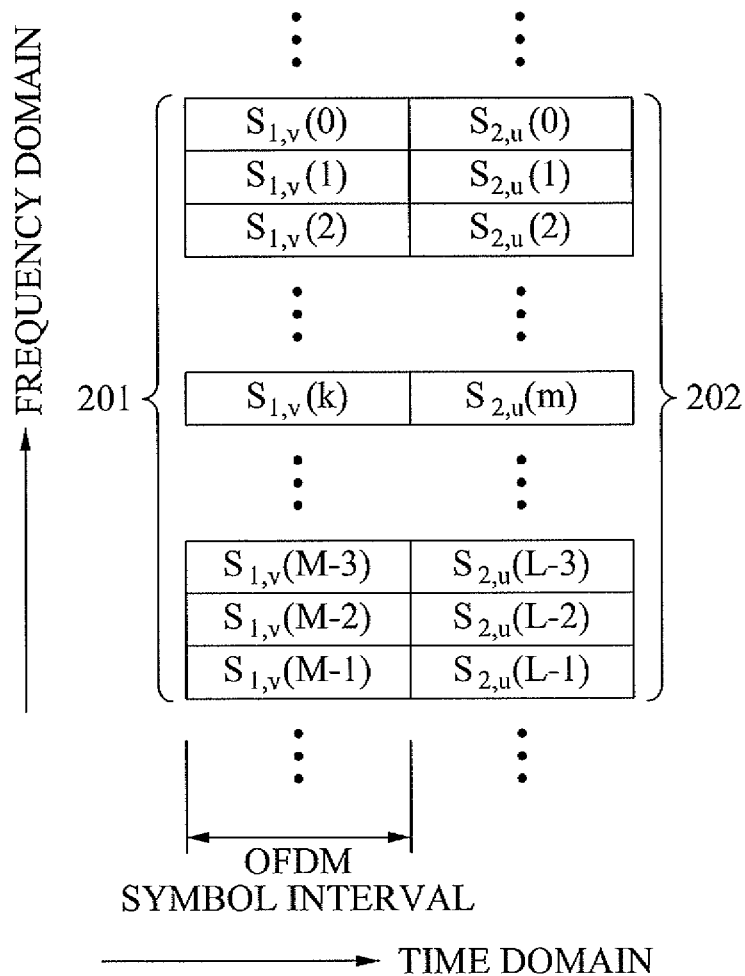
FIG. 2 is a diagram illustrating an example of a synchronization channel structure according to an embodiment of the present invention.

When the synchronization obtainment unit 101 follows the hierarchical procedure, a Time Division Multiplexing (TDM) resource as shown in FIG. 2 may be used in the transmission apparatus 100. In a primary synchronization channel, the synchronization obtainment unit 101 may obtain the symbol and the frequency synchronization. In a secondary synchronization channel, the base node sequence generator 102 may generate the base sequence that is the sequence for the node ID of the base node. The base node sequence generator 102 may employ both the primary synchronization channel and the secondary synchronization channel in order to more effectively use resources.

Referring to FIG. 2, frequency domain sequences of a primary synchronization channel 201 and a secondary synchronization channel 202 may be expressed, respectively, using $S_{1,v}(k)$ where k=0, 1, ..., M−1, and $S_{2,u}(m)$ where m=0, 1, ..., L−1.

Here, each of k and m denotes a subcarrier index, M denotes a number of subcarriers included in the primary synchronization channel 201, L denotes a number of subcarriers included in the secondary synchronization channel 202, v denotes a sequence index used by the primary synchronization channel 201, and u denotes a sequence index used by the secondary synchronization channel 202.

A main purpose of the primary synchronization channel 201 is to obtain the symbol and the frequency synchronization and thus it may be possible to use a single common sequence for all of nodes in the primary synchronization channel 201.

It is assumed that the primary synchronization channel 201 and the secondary synchronization channel 202 may be adjacent to each other, and may also be separated from each other by an orthogonal frequency division multiplexing (OFDM) symbol interval.

A process of obtaining, by the synchronization obtainment unit 101, the symbol and the frequency synchronization, and a process of generating, by the base node sequence generator 102, the base sequence that is the sequence of the node ID of the base node may be divided using a Frequency Division Multiplexing (FDM) scheme.

The base node sequence generator 102 may generate the base sequence, and transmit the generated base sequence to the relay node sequence generator 103. In this instance, when the transmission apparatus 100 corresponds to the base node, the base node sequence generator 102 may transmit the base sequence to the baseband signal generator 104 instead of transmitting the base sequence to the relay node sequence generator 103.

The relay node sequence generator 103 may generate the relay sequence by applying various types of schemes to the base sequence.

For example, the relay node sequence generator 103 may define a binary codeword, and generate the relay sequence by transforming the base sequence according to a sign of the binary codeword. Also, the relay node sequence generator 103 may generate the relay sequence by combining a cyclic sequence of the base sequence with a scramble sequence mapped to a sequence index for a primary synchronization channel. Also, the relay node sequence generator 103 may generate the relay sequence by combining the base sequence transformed according to the sign of the binary codeword with the cyclic sequence of the base sequence or the scramble sequence mapped to the sequence index for the primary synchronization channel.

A method of generating, by the relay node sequence generator 103, the relay sequence by combining the cyclic sequence of the base sequence with the scramble sequence mapped to the sequence index for the primary synchronization channel will be further described with reference to FIG. 6.

In particular, the method of defining the binary codeword and transforming the base sequence according to the sign of the binary codeword to generate the relay sequence may correspond to a method of transforming the base sequence using a scheme of mapping, to a sequence of the relay node, the base sequence transformed according to the sign to the binary codeword. In this instance, the relay node sequence generator 103 may generate the relay sequence by multiplying an element of the base sequence by an element of the binary codeword. The relay node sequence generator 103 may generate the relay sequence by reversing a sign of an imaginary number portion or a real number portion of an element value of the base sequence based on a sign of an element value of the binary codeword.

Examples of defining, by the relay node sequence generator 103, the binary codeword and transforming the base sequence according to the sign of the binary codeword to generate the relay sequence will be further described with reference to FIGS. 3 through 5.

In this instance, the baseband signal generator 104 may map transmission information to a time domain and a frequency domain using a synchronization pattern and a pilot pattern generated by the relay node sequence generator 103, and transmission traffic data frame control information transmitted from an outside, and thereby generate a transmission frame in a downlink frame form.

The baseband signal generator 104 may allocate the generated synchronization pattern to the synchronization channel.

The baseband signal generator 104 may set the transmission information so that a magnitude pattern of a time domain signal of a synchronization channel symbol interval mapped to the time domain and the frequency domain may not be in a flat form.

The magnitude pattern of the time domain signal of the synchronization channel symbol interval will be further described with reference to FIG. 8.

The baseband signal generator 104 may generate a baseband signal by mapping the base sequence or the relay sequence to the frequency domain and then to the time domain.

The transmitter 105 may transmit, via a transmit antenna, the baseband signal transferred from the baseband signal generator 104. The transmitter 105 may be an OFDM transmitter.

Figure 3:
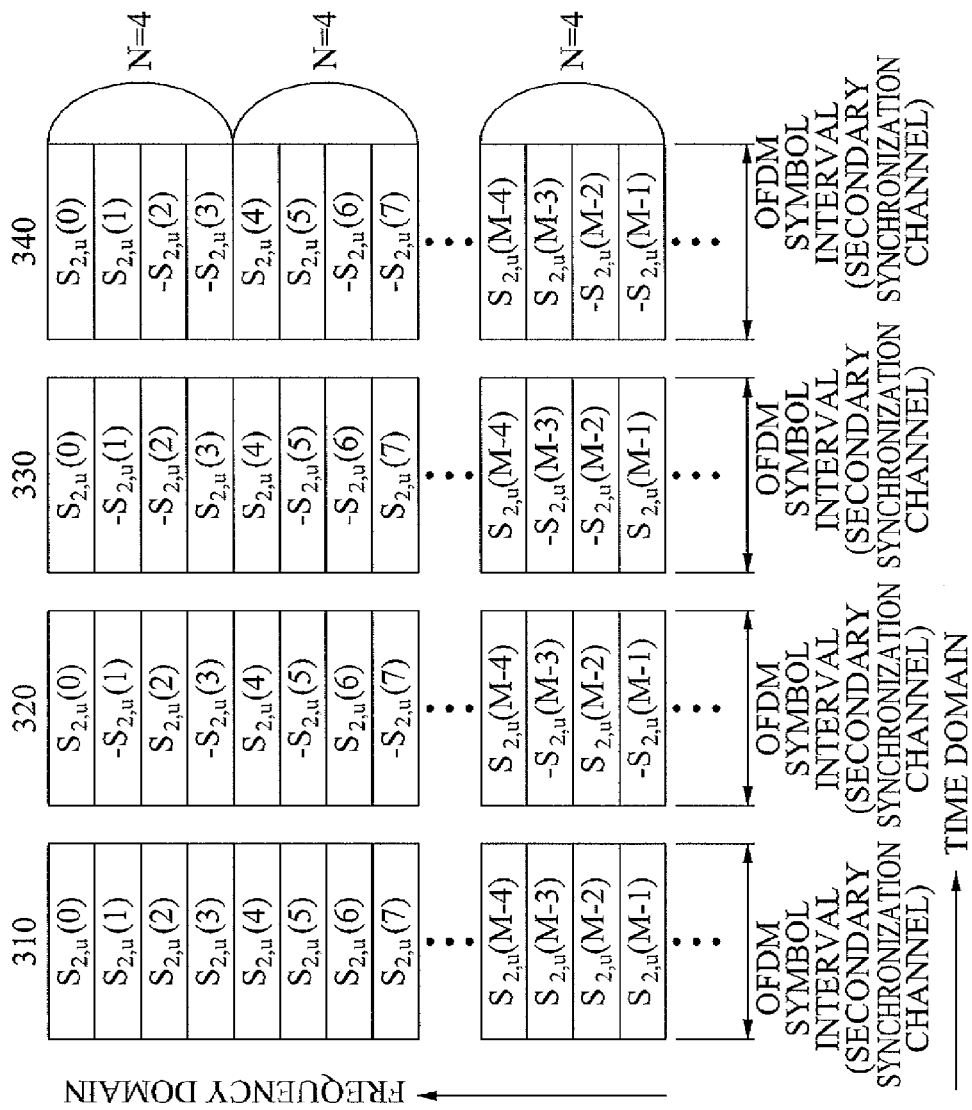
FIG. 3 is a diagram illustrating an example of a relay sequence and a base sequence used to generate the relay sequence according to an embodiment of the present invention.

FIG. 3 is a diagram illustrating an example of a relay sequence and a base sequence used to generate the relay sequence according to an embodiment of the present invention.

According to an embodiment of the present invention, there is provided a first application scheme of generating the relay sequence by defining a binary codeword and transforming the base sequence according to a sign of the binary codeword, and thereby is provided a method of generating the relay sequence by multiplying an element of the base sequence by an element of the binary codeword.

In the present embodiment, a frequency domain signal $s_1(m)$ of a secondary synchronization channel of a node l may satisfy the following Equation 1:

$$S_l(m)=C_l((m)_N)[Re\{S_{2,u}(m)\}+jIm\{S_{2,u}(m)\}], l<N. \quad \text{[Equation 1]}$$

Here, when $l=0$, l denotes a base node, and when $l \geq 1$, l denotes a relay node. Also, $(x)_N$ denotes N-Modulo of x, $Re\{y\}$ denotes a real number value of y, $Im\{y\}$ denotes an imaginary number value of y, and $C_l((m)_N)$ denotes an element of a binary sequence having a length N. N may be a transformed sequence element number to be grouped.

For example, when $N=4$ and a Hadamard code is used, a codeword $C_l$ may be $C_0=[1,1,1,1]$, $C_1=[1,-1,1,-1]$, $C_2=[1,-1,-1,1]$, and $C_3=[1,1,-1,-1]$.

Referring to FIG. 3, when $N=4$, the base node sequence generator 102 may allocate, for a node ID of a base node 310, a sequence index u to a frequency domain signal $S_{2,u}(m)$ of a secondary synchronization channel of the base node 310.

The relay node sequence generator 103 may generate the codeword $C_l$ having the length N according to a value of N based on the Hadamard code. The relay node sequence generator 103 may allocate, to a frequency domain of a secondary synchronization channel of a first relay node 320, the same sequence as the sequence allocated to the base node 310, periodically group four continuous sequence elements, and sequentially multiply a codeword $C_1$ by the grouped four elements to thereby generate a sequence for a node ID of the first relay node 320.

The relay node sequence generator 103 may allocate, to a frequency domain of a secondary synchronization channel of a second relay node 330, the same sequence as the sequence allocated to the base node 310, periodically group four continuous sequence elements, and sequentially multiply a codeword $C_2$ by the grouped four elements to thereby generate a sequence for a node ID of the second relay node 330.

The relay node sequence generator 103 may allocate, to a frequency domain of a secondary synchronization channel of a third relay node 340, the same sequence as the sequence allocated to the base node 310, periodically group four continuous sequence elements, sequentially multiply a codeword $C_3$ by the grouped four elements to thereby generate a sequence for a node ID of the third relay node 340.

Here, N denotes an integer greater than 1. Based on a value of N, a different binary orthogonal code or a semi-orthogonal code having the length N may be used.

Figure 4:
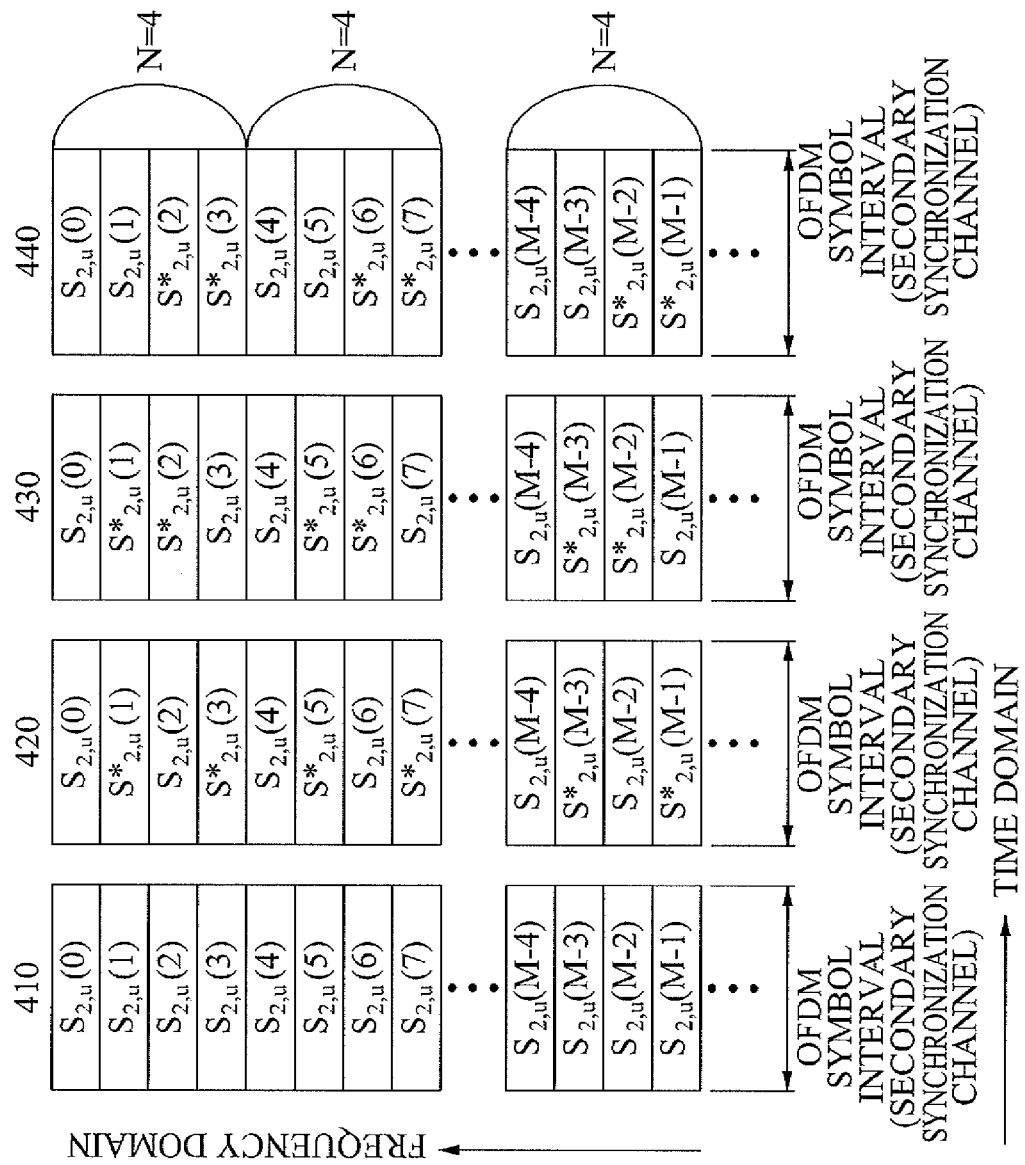
FIG. 4 is a diagram illustrating an example of a relay sequence and a base sequence used to generate the relay sequence according to another embodiment of the present invention.

FIG. 4 is a diagram illustrating an example of a relay sequence and a base sequence used to generate the relay sequence according to another embodiment of the present invention.

According to another embodiment of the present invention, there is provided a second application scheme of generating the relay sequence by defining a binary codeword and transforming the base sequence according to a sign of the binary codeword, and thereby providing a method of generating the relay sequence by taking a conjugate of an element value of the base sequence, that is, reversing a sign of an imaginary number portion of an element value of the base sequence based on a sign of an element value of the binary codeword.

In the present embodiments, a frequency domain signal $s_1(m)$ of a secondary synchronization channel of a node l may satisfy the following Equation 2:

$$S_l(m)=Re\{S_{2,u}(m)\}+jC_l((m)_N)Im\{S_{2,u}(m)\}, l \leq N. \quad \text{[Equation 2]}$$

Here, the relay node sequence generator 103 may generate the binary codeword having a length N according to a value of N. The relay node sequence generator 103 may allocate, to a frequency domain of a secondary synchronization channel of a first relay node 420, the same sequence as the sequence allocated to a base node 410, periodically group four continuous sequence elements, and sequentially apply the binary codeword with the grouped four elements to thereby generate a sequence for a node ID of the first relay node 420.

In this instance, the relay node sequence generator 103 may verify an element value of the binary codeword. When the element value of the binary codeword is 1, the relay node sequence generator 103 may not change an element value of a corresponding base node sequence. When the element value of the binary codeword is −1, the relay node sequence generator 103 may reverse a sign of an imaginary number portion of the element value of the corresponding base node sequence.

Also, the relay node sequence generator 103 may further generate a sequence for a node ID of a second relay node 430 and a sequence for a node ID of a third relay node 440 using the aforementioned node ID sequence generation scheme of the first relay node 420.

Figure 5:
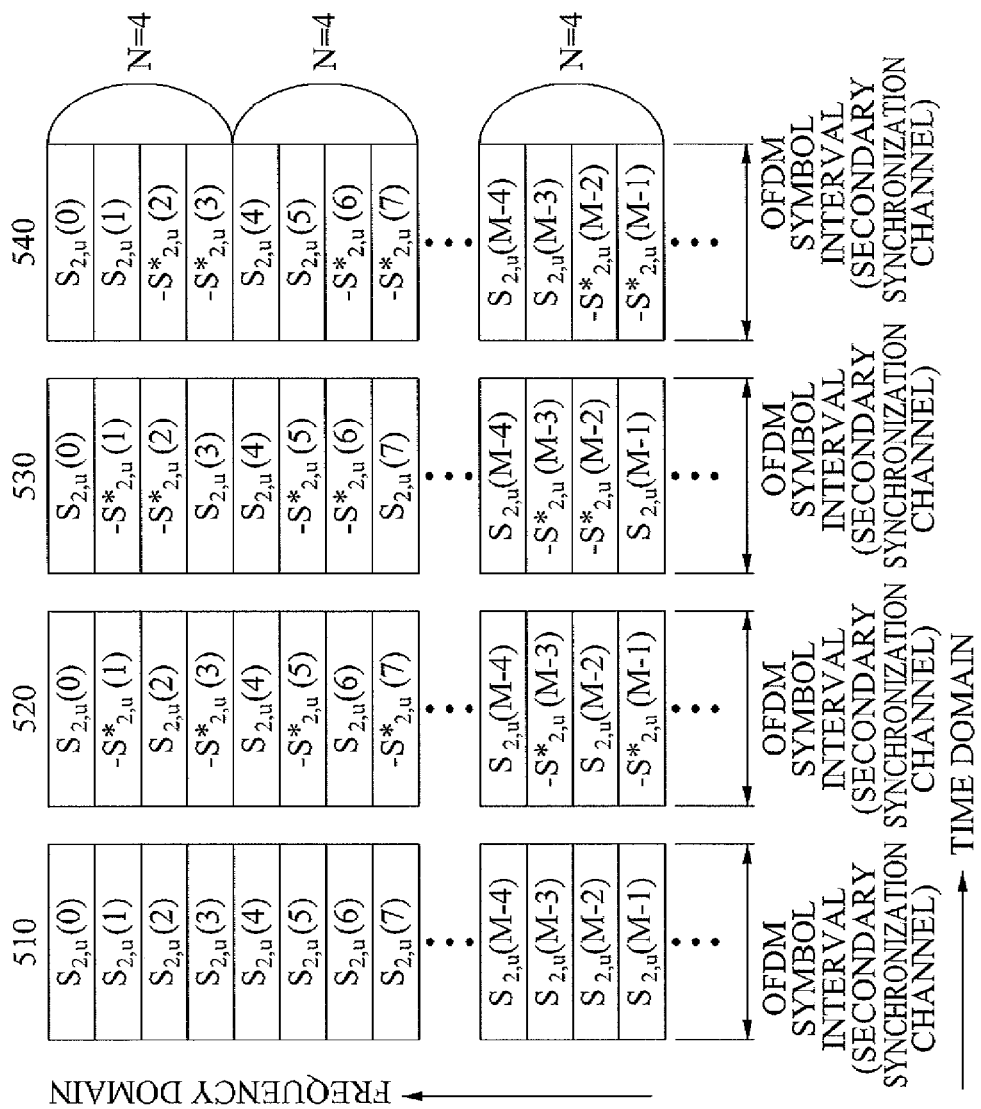
FIG. 5 is a diagram illustrating an example of a relay sequence and a base sequence used to generate the relay sequence according to still another embodiment of the present invention.

FIG. 5 is a diagram illustrating an example of a relay sequence and a base sequence used to generate the relay sequence according to still another embodiment of the present invention.

According to still another embodiment of the present invention, there is provided a third application scheme of generating the relay sequence by defining a binary codeword and transforming the base sequence according to a sign of the binary codeword, and thereby providing a method of generating the relay sequence by reversing a sign of a real number portion of an element value of the base sequence based on a sign of an element value of the binary codeword.

In the present embodiment, a frequency domain signal $s_1(m)$ of a secondary synchronization channel of a node l may satisfy the following Equation 3:

$$S_1(m)=C_1((m)_N)Re\{S_{2,u}(m)\}+jIm\{S_{2,u}(m)\}, l<N. \quad \text{[Equation 3]}$$

Here, the relay node sequence generator 103 may generate the binary codeword having a length N according to a value of N. The relay node sequence generator 103 may allocate, to a frequency domain of a secondary synchronization channel of a first relay node 520, the same sequence as the sequence allocated to a base node 510, periodically group four continuous sequence elements, and sequentially apply the binary codeword with the grouped four elements to thereby generate a sequence for a node ID of the first relay node 520.

In this instance, the relay node sequence generator 103 may verify an element value of the binary codeword. When the element value of the binary codeword is 1, the relay node sequence generator 103 may not change an element value of a corresponding base node sequence. When the element value of the binary codeword is −1, the relay node sequence generator 103 may reverse a sign of an imaginary number portion of the element value of the corresponding base node sequence.

Also, the relay node sequence generator 103 may further generate a sequence for a node ID of a second relay node 530 and a sequence for a node ID of a third relay node 540 using the aforementioned node ID sequence generation scheme of the first relay node 520.

Figure 6:
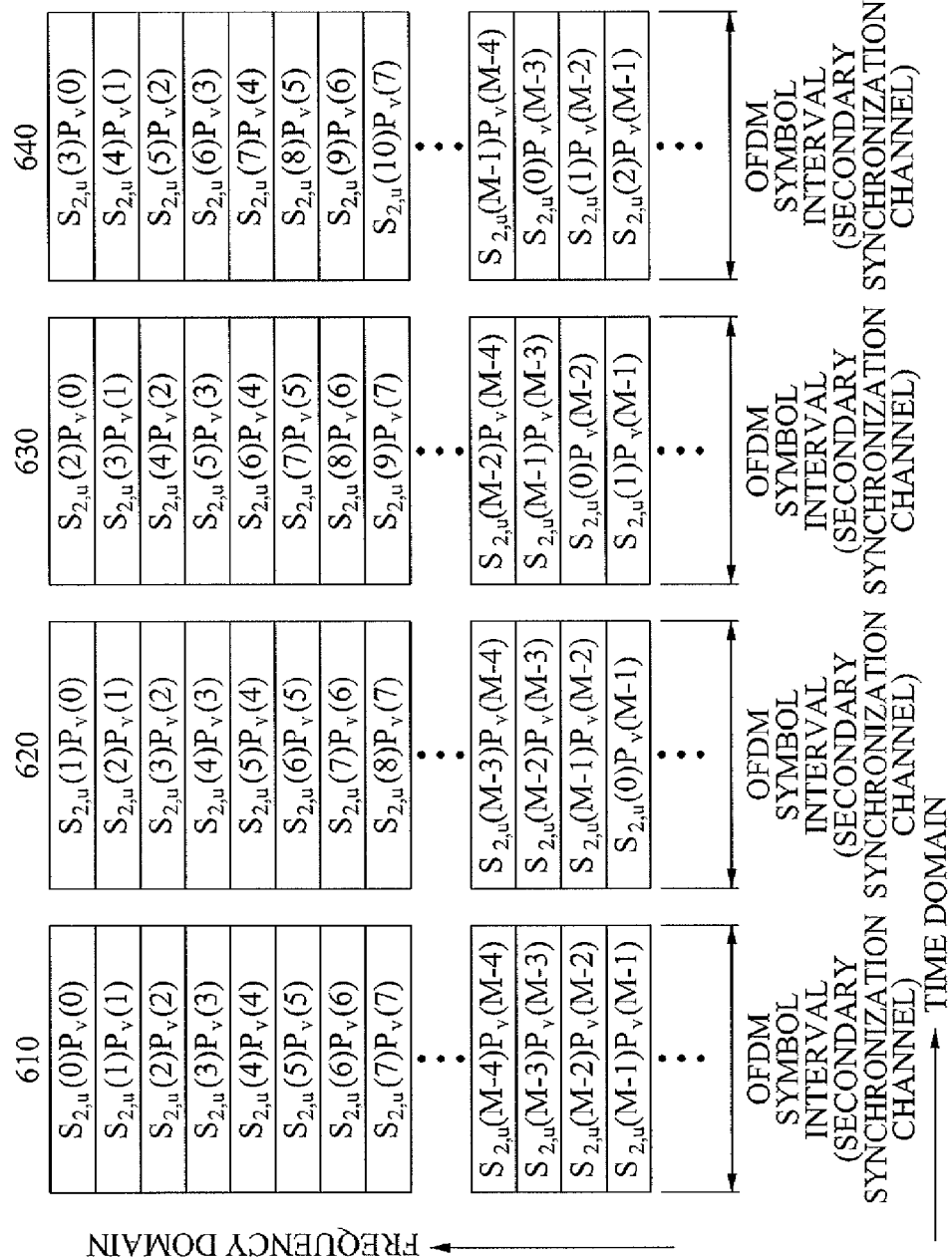
FIG. 6 is a diagram illustrating an example of a relay sequence and a base sequence used to generate the relay sequence according to yet another embodiment of the present invention.

FIG. 6 is a diagram illustrating an example of a relay sequence and a base sequence used to generate the relay sequence according to yet another embodiment of the present invention.

According to the yet other embodiment of the present invention, there is provided a method of generating the relay sequence by combining a cyclic sequence of the base sequence with a scramble sequence mapped to a sequence index of a primary synchronization channel.

In the present embodiment, a frequency domain signal $s_1(m)$ of a secondary synchronization channel of a node l may satisfy the following Equation 4:

$$S_1(m)=S_{2,u}((m+l)_M)P_v(m) \text{ or } S_{2,u}((m+l)_M)P_v((m+l)_M). \quad \text{[Equation 4]}$$

Here, $(x)_M$ denotes M-Modulo of x, and $P_v(m)$ denotes a scramble sequence mapped to a sequence index v of a frequency domain signal of the primary synchronization channel.

The relay node sequence generator 103 may basically allocate the scramble sequence $P_v(m)$ mapped to the sequence index v for the primary synchronization channel and thereby increase a number of distinguishable nodes. The relay node sequence generator 103 may allocate sequences having different V indexes instead of using a single primary synchronization channel resource, and thereby increase the number of distinguishable nodes to be as many as V. For example, when a plurality of nodes has the same sequence index u of a secondary synchronization channel, however has a different sequence index v of a primary synchronization channel, the plurality of nodes may be considered to be different nodes.

In the above Equation 4, a sequence where a frequency domain signal $s_{2,u}(m)$ of a base node 610 is cycled by l may be allocated to recognize a relay node ID.

In this instance, the relay node sequence generator 103 may generate a sequence for a node ID of a first relay node 620 by combining a cyclic sequence of a secondary synchronization channel of the base node 610 with a scramble sequence mapped to a sequence index allocated to the frequency domain of the primary synchronization channel of the first relay node 620.

Also, the relay node sequence generator 103 may further generate a sequence for a node ID of a second relay node 630 and a sequence for a node ID of a third relay node 640 using the aforementioned node ID sequence generation scheme of the first relay node 620.

Regardless of the use of the sequence index for the primary synchronization channel, the relay node sequence generator 103 may use a scramble sequence arbitrarily allocated to the secondary synchronization channel, and may also generate sequences for node IDs of relay nodes using only the cyclic sequence of the primary synchronization channel of the base node 610.

Also, the relay node sequence generator 103 may generate the sequences for the node IDs of the relay nodes using a scheme of combining the scheme of FIG. 6 with the schemes of FIGS. 3 through 5.

According to a yet still another embodiment, it is possible to generate a relay sequence by defining a binary codeword, transforming a base sequence according to a sign of the binary codeword, and combining the transformed base sequence with a cyclic sequence of the base sequence or a scramble sequence mapped to a sequence index for a primary synchronization channel.

As a first application scheme of the present embodiment, the relay node sequence generator 103 may generate sequences for node IDs of relay nodes by combining a frequency domain sequence index-based scramble sequence $P_v(m)$ of the primary synchronization channel with the above Equation 1. The first application scheme may satisfy the following Equation 5:

$$S_1(m)=C_1((m)_N)S_{2,u}(m)P_v(m) \quad \text{[Equation 5]}$$

As a second application scheme of the present embodiment, the relay node sequence generator 103 may generate sequences for node IDs of relay nodes by combining $P_v(m)$ with the above Equation 2. The second application scheme may satisfy the following Equation 6:

$$S_1(m)=[Re\{S_{2,u}(m)\}+jC_1((m)Im\{S_{2,u}(m)\}]P_v(m). \quad \text{[Equation 6]}$$

As a third application scheme of the present embodiment, the relay node sequence generator 103 may generate sequences for node IDs of relay nodes by combining $P_v(m)$ with the above Equation 3. The third application scheme may satisfy the following Equation 7:

$$S_1(m)=[C_1((m)_N)Re\{S_{2,u}(m)\}+jIm\{S_{2,u}(m)\}]P_v(m). \quad \text{[Equation 7]}$$

As a fourth application scheme of the present embodiment, the relay node sequence generator 103 may generate sequences for node IDs of relay nodes by combining $P_v(m)$ with the above Equation 4. The fourth application scheme may satisfy the following Equation 8:

$$S_1(m)=C_{\lfloor l/M \rfloor}((m)S_{2,u}((m+l)_M)P_v(m), \text{ or}$$

$$S_1(m)=C_{(1)_N}((m)_N)S_{2,u}((m+\lfloor l/N \rfloor)_M)P_v(m). \quad \text{[Equation 8]}$$

As a fifth application scheme of the present embodiment, the relay node sequence generator 103 may generate sequences for node IDs of relay nodes by combining the above Equation 4 with the above Equation 2. The fifth application scheme may satisfy the following Equation 9:

$$S_1(m)=[Re\{S_{2,u}((m+l)_M)\}+jC_{\lfloor l/M \rfloor}((m)_N)Im\{S_{2,u}((m+l)_M)\}]P_v(m), \text{ or}$$

$$S_1(m)=[Re\{S_{2,u}((m+\lfloor l/N \rfloor)_M)\}+jC_{(l)_N}((m)_N)Im\{S_{2,u}((m+\lfloor l/N \rfloor)_M)\}]P_v(m). \quad \text{[Equation 9]}$$

As a sixth application scheme of the present embodiment, the relay node sequence generator 103 may generate sequences for node IDs of relay nodes by combining the above Equation 4 with the above Equation 3. The sixth application scheme may satisfy the following Equation 10:

$$S_1(m)=[C_{\lfloor l/M \rfloor}((m)_N)Re\{S_{2,u}((m+l)_M)\}+jIm\{S_{2,u}((m+l)_M)\}]P_v(m), \text{ or}$$

$$S_1(m)=[C_{(l)_N}((m)_N)Re\{S_{2,u}((m+\lfloor l/N \rfloor)_M)\}+jIm\{S_{2,u}((m+\lfloor l/N \rfloor)_M)\}]P_v(m). \quad \text{[Equation 10]}$$

In this instance, the relay node sequence generator 103 may delete $P_v(m)$ in the above fourth application scheme through the sixth application scheme of the present embodiment.

Figure 7:
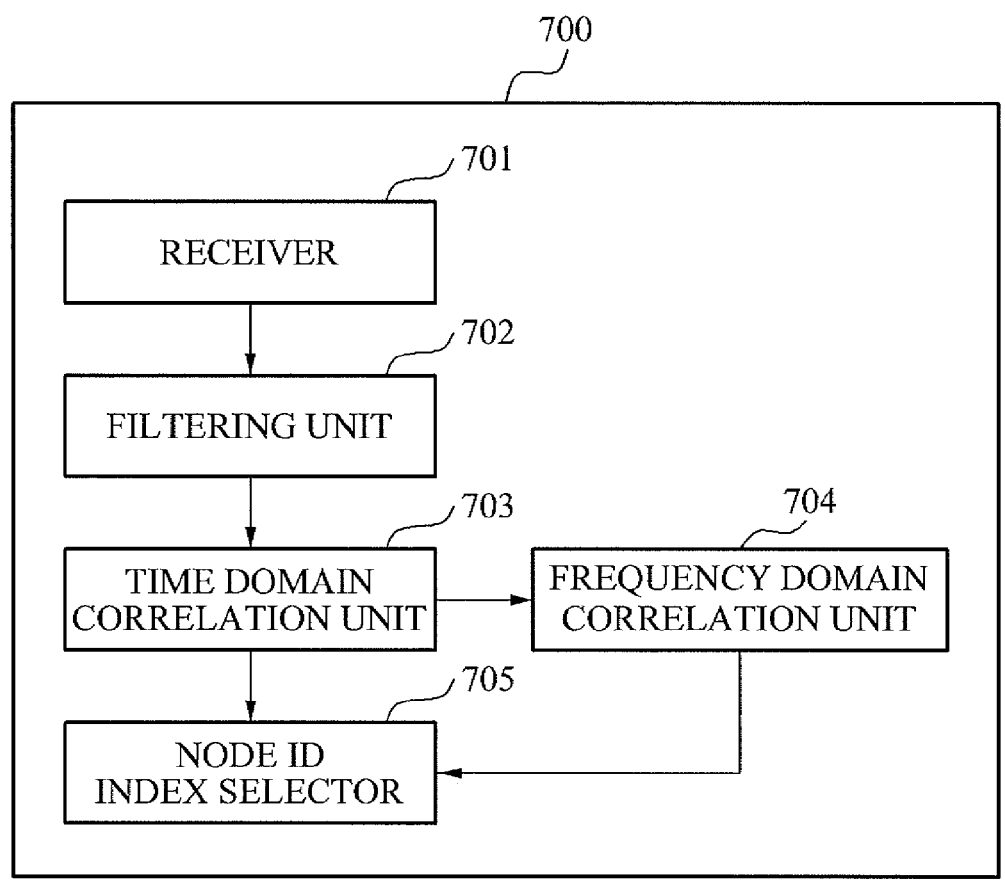
FIG. 7 is block diagram illustrating a configuration of a reception apparatus for allocating a sequence to a synchronization channel for a node ID according to an embodiment of the present invention.

FIG. 7 is block diagram illustrating a configuration of a reception apparatus 700 for allocating a sequence to a synchronization channel for a node ID according to an embodiment of the present invention.

Referring to FIG. 7, in the reception apparatus 700, when a receiver 701 receives a baseband signal, a filtering unit 702 may filter the baseband signal based on a bandwidth allocated to the synchronization channel. A time domain correlation unit 703 may calculate a correlation value for the baseband signal and a time domain signal stored in advance in a synchronization channel symbol interval, and extract a sample time having a greatest correlation value for each primary synchronization channel sequence index. A frequency domain correlation unit 704 may calculate a correlation value for the baseband signal and a frequency signal for a node ID obtainment in the sample time, and verify the greatest correlation value. A node ID index selector 705 may generate a combined correlation value by combining a correlation value of the sample time extracted in the time domain correlation unit 703 and the correlation value verified in the frequency domain correlation unit 704, and may select a node ID index and a time synchronization point at a point in time when the combined correlation value is maximized, as a node ID index and a time synchronization point recognized by the receiver 701.

Here, the frequency signal for the node ID obtainment used in the frequency domain correlation unit 704 may be a frequency domain signal for the node ID obtainment known by the node ID allocation schemes disclosed using the above Equation 1 through Equation 10.

In the reception apparatus 700, when the time domain correlation unit 703 extracts a time synchronization point by calculating the correlation value for the baseband signal and the time domain signal stored in advance in the synchronization channel symbol interval, the frequency domain correlation unit 704 may calculate the correlation value for the baseband signal and the frequency signal for the node ID obtainment and thereby verify a node ID index having the greatest correlation value. The node ID index selector 705 may select, as the node ID index recognized by the receiver 701, the node ID index having the greatest correlation value, and may also select, as the time synchronization point recognized by the receiver 701, a time synchronization point corresponding to the node ID index having the greatest correlation value.

Figure 8:
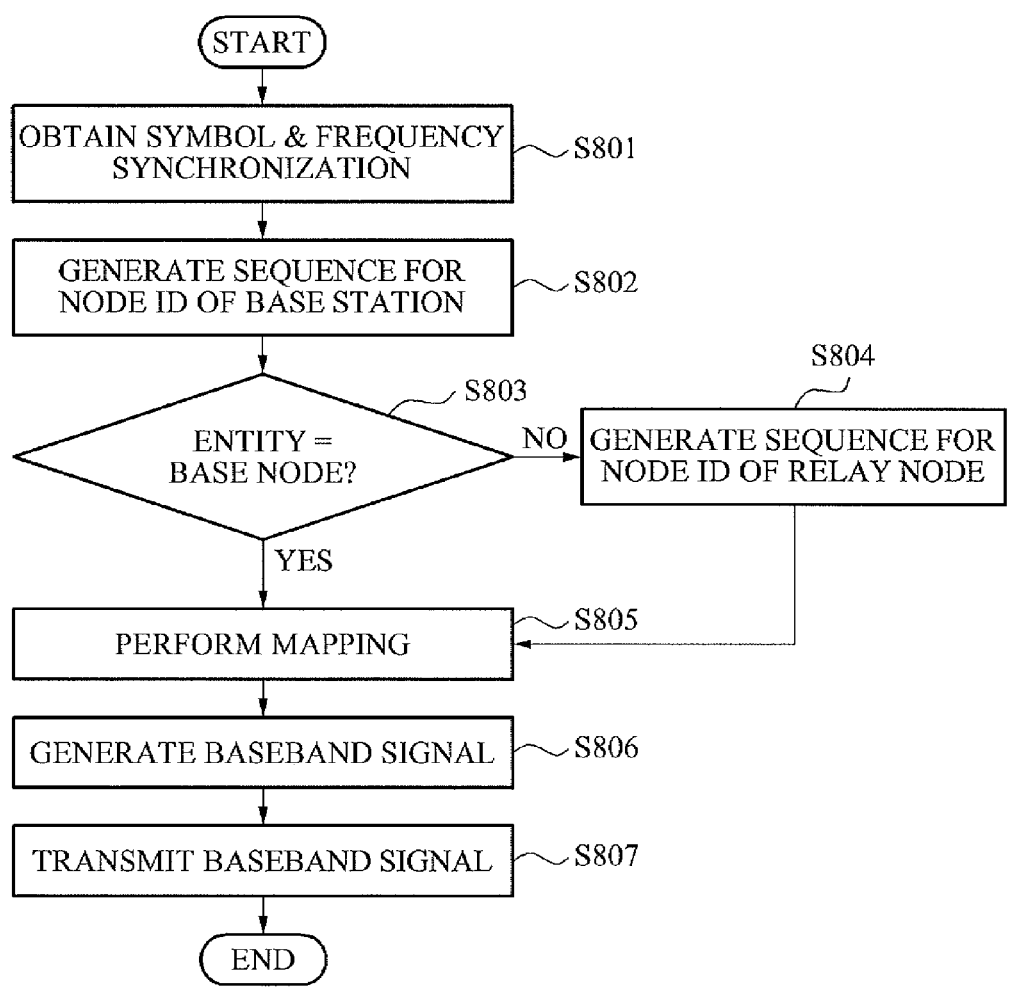
FIG. 8 is a flowchart illustrating a transmission method for allocating a sequence to a synchronization channel for a node ID according to an embodiment of the present invention.

FIG. 8 is a flowchart illustrating a transmission method for allocating a sequence to a synchronization channel for a node ID according to an embodiment of the present invention.

In operation S801, the synchronization obtainment unit 101 may obtain a symbol and a frequency synchronization.

In operation S802, the base node sequence generator 102 may generate a base sequence that is a sequence for a node ID of a base node.

In operation S803, the base node sequence generator 102 may verify whether an entity transmitting a baseband signal is the base node.

When the entity transmitting the baseband signal is not the base node, the relay node sequence generator 103 may generate a relay sequence that is a sequence for a node ID of a relay node by transforming the base sequence in operation S804.

When the entity transmitting the baseband signal is the base node, the baseband signal generator 104 may map the base sequence to a frequency domain in operation S805. Conversely, when the entity transmitting the baseband signal is not the base node, the baseband signal generator 104 may map the relay sequence generated in operation S804 to the frequency domain in operation S805.

In operation S806, the baseband signal generator 104 may generate the baseband signal by mapping the mapped signal to the time domain.

In operation S807, the transmitter 105 may transmit the baseband signal.

Figure 9:
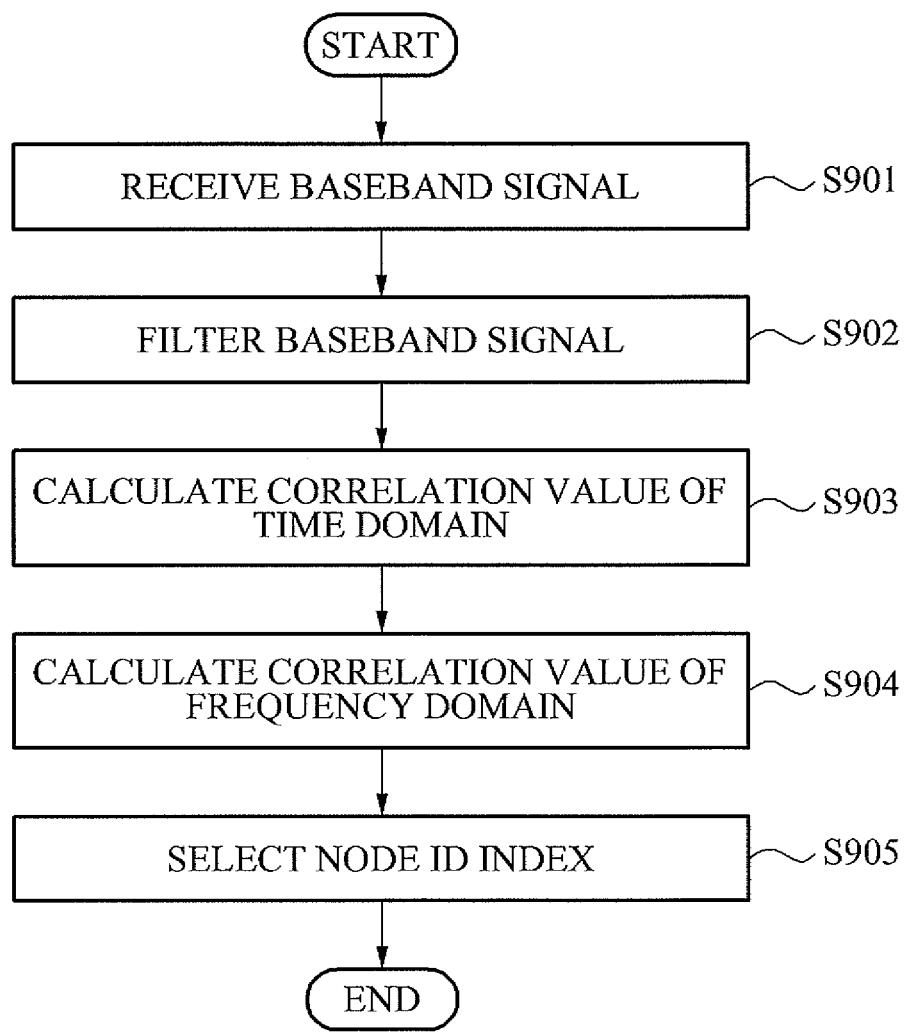
FIG. 9 is a flowchart illustrating a configuration of a reception method for allocating a sequence to a synchronization channel for a node ID according to an embodiment of the present invention.

FIG. 9 is a flowchart illustrating a reception method for allocating a sequence to a synchronization channel for a node ID according to an embodiment of the present invention.

In operation S901, the receiver 701 may receive a baseband signal.

In operation S902, the filtering unit 702 may filter the baseband signal based on a bandwidth allocated to the synchronization channel.

In operation S903, the time domain correlation unit 703 may calculate a correlation value for each primary synchronization channel sequence index by performing a correlation for the baseband signal and a time domain signal stored in advance in a synchronization channel symbol interval. In this instance, the time domain correlation unit 703 may extract a sample time having a greatest correlation value.

In operation S904, the frequency domain correlation unit 704 may calculate a correlation value for the baseband signal and a frequency signal for a node ID obtainment based on the extracted sample time, and thereby verify the greatest correlation value.

In operation S905, the node ID index selector 705 may generate a combined correlation value by combining a correlation value of the sample time extracted in operation S903 with the correlation value verified in operation S904, and may select, as a node ID index and a time synchronization point recognized by the receiver 701, a node ID index and a time synchronization point at a point in time when the combined correlation value is maximized.

An apparatus for allocating a sequence to a synchronization channel for a node ID according to an embodiment of the present invention may generate a sequence for a node ID of a relay node based on a sequence for a node ID allocated to a base node, and thereby may maximize an increase in a number of nodes. When variably increasing or decreasing a number of relay nodes for each base node, it is possible to minimize an effect against a system and thereby enhance a self-organized network.

The above-described exemplary embodiments of the present invention may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVDs; magneto-optical media such as floptical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention, or vice versa.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A transmission apparatus comprising:
    a first generator to assign a first sequence including first symbols into first sub-carriers in a frequency domain;
    a second generator to derive second symbols from each of the first symbols, and to assign the second sequence including the second symbols into second sub-carriers in the frequency domain; and
    a transmitter to transmit the first sequence assigned into the first sub-carriers and the second sequence assigned into the second sub-carriers,
    wherein a transfer resource to transmit the first sequence is distinguished from a transfer resource to transmit the second sequence,
    wherein the second generator derives each of the second symbols by maintaining or reversing a sign of a real number or an imaginary number of the each of the first symbols included in the first sequence,
    wherein the second generator derives each of the second symbols by applying at least one of complex-conjugation, minus 1, and plus 1 to each of the first symbols.

2. The apparatus of claim 1, wherein the first sequence is used to recognize a first node and the second sequence is used to recognize a second node.

3. The apparatus of claim 1, wherein the first node is a base node, and
    wherein the second node is a relay node which is located in range of the base node.

4. The apparatus of claim 1, wherein the second generator derives the second sequence including the second symbols by reversing a sign of a real number portion or an imaginary number portion of the first symbols based on an element of a code word.

5. The apparatus of claim 4, wherein the second generator applies the element of the code word to the first symbols included in the first sequence, in the second node.

6. The apparatus of claim 1, wherein the second generator derives the second sequence including the second symbols by applying the cyclic manner to the first symbols.

7. A reception apparatus for allocating a sequence to a synchronization channel for a node ID, the reception apparatus comprising:
    a receiver to receive a baseband signal;
    a filtering unit to filter the baseband signal based on a bandwidth allocated to the synchronization channel;
    a time domain correlation unit to calculate a correlation value for the baseband signal and a time domain signal stored in advance in a synchronization channel symbol interval, and to extract a sample time having a greatest correlation value for each primary synchronization channel sequence index;
    a frequency domain correlation unit to calculate a correlation value for the baseband signal and a frequency signal for a node ID obtainment in the sample time, and to verify the greatest correlation value; and
    a node ID index selector to generate a combined correlation value by combining a correlation value of the sample time extracted in the time domain correlation unit and the correlation value verified in the frequency domain correlation unit, and to select a node ID index and a time synchronization point at a point in time when the combined correlation value is maximized, as a node ID index and a time synchronization point recognized by the receiver.

8. A reception method for allocating a sequence to a synchronization channel for a node ID, the reception method comprising:
    receiving a baseband signal;
    filtering the baseband signal based on a bandwidth allocated to the synchronization channel;
    extracting a sample time by calculating a correlation value for the baseband signal and a time domain signal stored in advance in a synchronization channel symbol interval;
    calculating a correlation value for the baseband signal and a frequency signal for a node ID obtainment in the sample time to select a node ID index having a greatest correlation value as a node ID index recognized by a receiver; and
    selecting, as the time synchronization point received by the receiver, a time synchronization point corresponding to the node ID index having the greatest correlation value.

9. A receiving apparatus, comprising:
- a first receiver to receive a first sub-carriers assigned a first sequence including first symbols in a frequency domain;
- a second receiver to receive a second sub-carriers assigned a second sequence including second symbols in the frequency domain; and
- an extractor to extract the first symbols from the first sequence and the second symbols from the second sequence,
- wherein a transfer resource to transmit the first sequence is distinguished from a transfer resource to transmit the second sequence,
- wherein each of the second symbols is derived by maintaining or reversing a sign of a real number or an imaginary number of the each of the first symbols included in the first sequence,
- wherein the second generator derives each of the second symbols by applying at least one of complex-conjugation, minus 1, and plus 1 to each of the first symbols.

10. The apparatus of claim 9, wherein the first sequence is used to recognize a first node and the second sequence is used to recognize a second node.

\* \* \* \* \*